United States Patent [19]

Voye

[11] Patent Number: 4,489,808

[45] Date of Patent: Dec. 25, 1984

[54] COLLAPSIBLE SAWHORSE

[76] Inventor: Bradford D. Voye, 4725 Prinston Dr., Corpus Christi, Tex. 78411

[21] Appl. No.: 544,521

[22] Filed: Oct. 24, 1983

[51] Int. Cl.[3] .............................................. F16M 11/00

[52] U.S. Cl. .................................... 182/155; 182/184; 182/225

[58] Field of Search ........ 182/155, 153, 154, 181-186, 182/224-226

[56] References Cited

U.S. PATENT DOCUMENTS

| | | | |
|---|---|---|---|
| 598,100 | 2/1898 | Kaganovsky | 182/155 |
| 1,103,699 | 7/1914 | South | 182/155 |
| 1,303,416 | 5/1919 | Tidyman | 182/155 |
| 1,479,209 | 1/1924 | Topp | 182/155 |
| 2,824,771 | 2/1958 | Blenski | 182/155 |
| 3,198,286 | 8/1965 | Wilson | 182/155 |
| 3,631,941 | 1/1972 | Greenman | 182/155 |

*Primary Examiner*—Reinaldo P. Machado
*Attorney, Agent, or Firm*—G. Turner Moller

[57] ABSTRACT

A collapsible sawhorse includes a horizontal load supporting beam which is pivoted in the center thereof. A pair of legs is disposed at each end of the beam and each is mounted for compound pivotal movement between a first load supporting position and a second position nested within the confines of the beam. When in its load supporting position, the sawhorse is of conventional size. When in its collapsed position, the volume of the sawhorse corresponds to the volume of the horizontal beam.

9 Claims, 10 Drawing Figures

FIG. 8
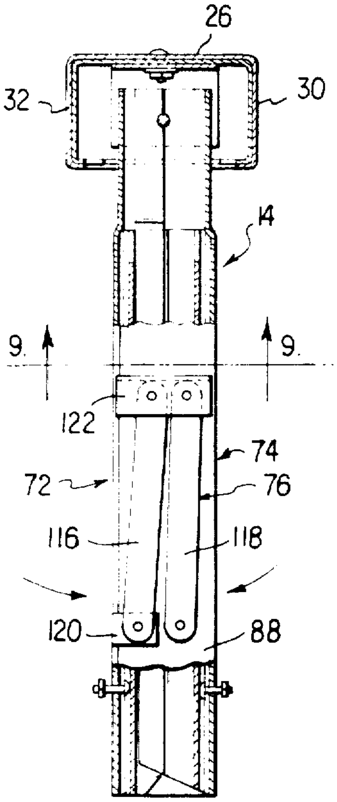
FIG. 9
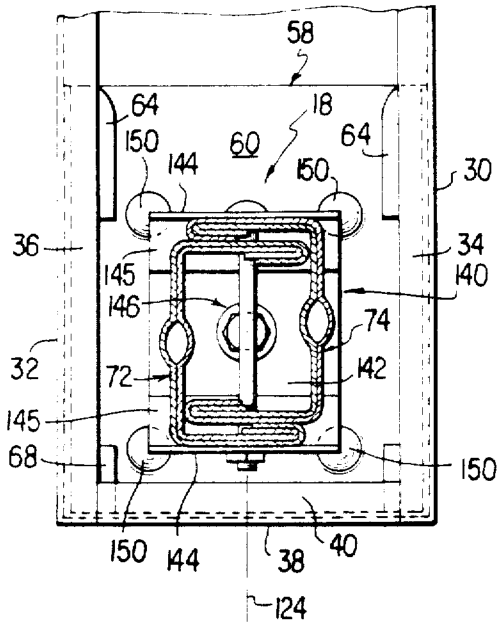
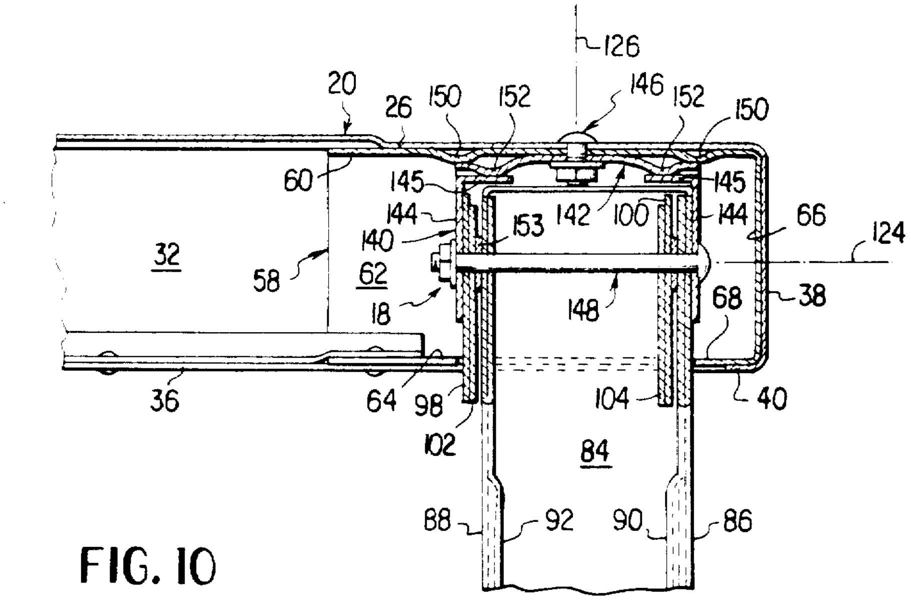
FIG. 10

COLLAPSIBLE SAWHORSE

This invention relates to sawhorses and particularly to sawhorses which can be collapsed from a conventional load supporting position into a collapsed or storage position so that the sawhorse can be readily transported or stored between periods of use.

Collapsible sawhorses are, of course, well known in the prior art and exhibit various degrees of collapsibility using various techniques of rearranging the supporting legs relative to the horizontal beam. Disclosures similar to this invention are found in U.S. Pat. Nos. 598,100; 1,103,699 and 1,303,416.

The collapsible sawhorses of the prior art have numerous disadvantages as may be evidenced by the fact that none are widely available through normal commercial channels.

One of the unusual features of this invention is that the entire sawhorse, in its collapsed or storage position, occupies the same volume as the horizontal supporting beam. In other words, the legs of the sawhorse are collapsed wholly within the confines of the horizontal beam. This manifestly results in minimum storage requirements for the sawhorse of this invention.

It is an object of this invention to provide an improved sawhorse exhibiting a large degree of collapsibility.

Another object of this invention is to provide a new and improved sawhorse which cnveniently may be made of metal or plastic and which exhibits substantial advantages over the prior art.

Other objects and advantages of this invention will become more fully apparent as this description proceeds, reference being made to the accompanying drawing and appended claims.

IN THE DRAWINGS:

FIG. 8 is a vertical cross-sectional view, similar to FIG. 4, illustrating the sawhorse with the legs thereof pivoted into a nested configuration;

FIG. 9 is a cross-sectional view of the sawhorse of FIG. 8, taken substantially along line 9—9 thereof as viewed in the direction indicated by the arrows; and FIG. 10 is a cross-sectional view of the sawhorse of this invention, taken substantially along line 10—10 of FIG. 4 as viewed in the direction indicated by the arrows.

Figure 1:
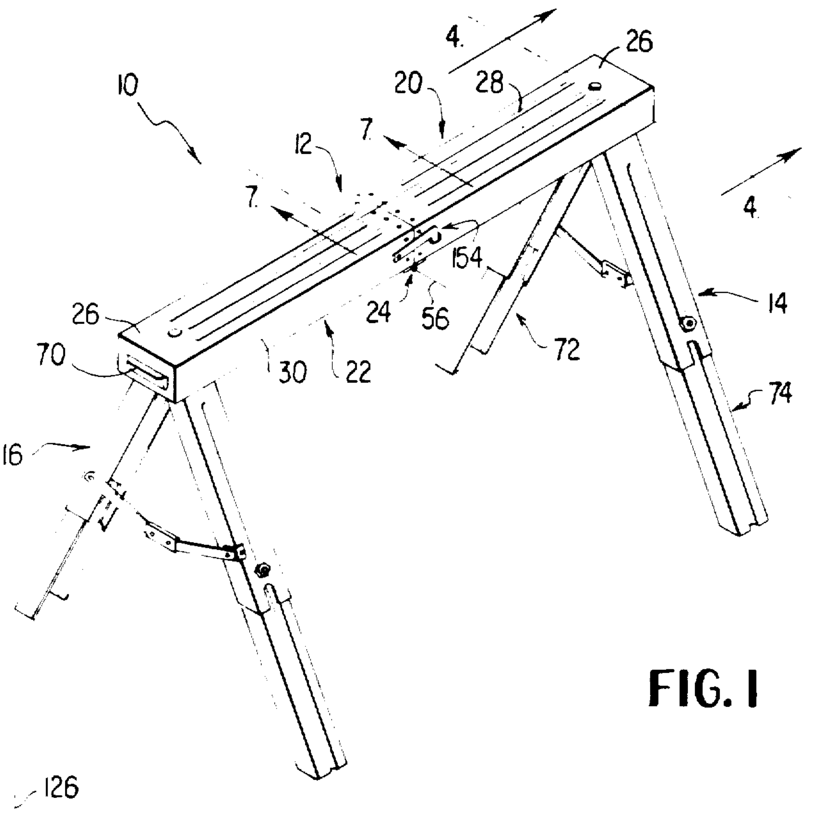
FIG. 1 is an isometric view of the sawhorse of this invention illustrated in its load supporting positions.
Figure 2:
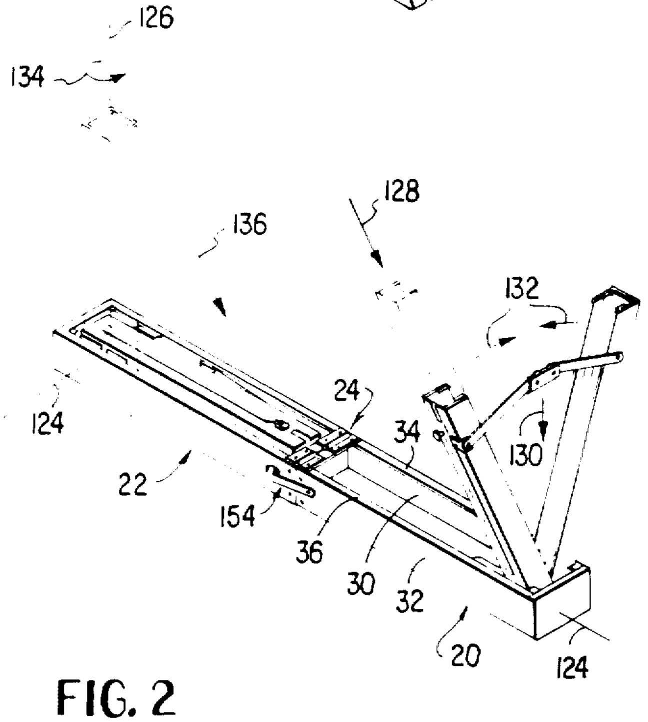
FIG. 2 is an isometric view of the sawhorse of this invention illustrated in an intermediate position between its load supporting and collapsed positions.
Figure 3:
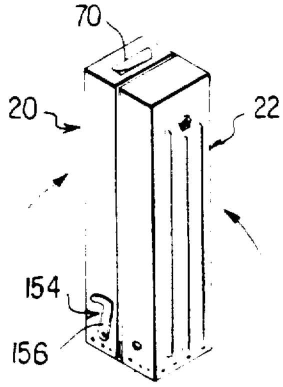
FIG. 3 is an isometric view of the sawhorse of FIGS. 1 and 2 illustrated in its collapsed position.

Referring to FIGS. 1-3, the collapsible sawhorse 10 of this invention comprises, as major components, a beam 12, two pairs of legs 14, 16 at opposite ends of the beam 12 and means 18 mounting the legs 14, 16 to the beam 12 for movement between a first load supporting position illustrated in FIG. 1 and a second storage position illustrated in FIGS. 2 and 3.

Figure 7:
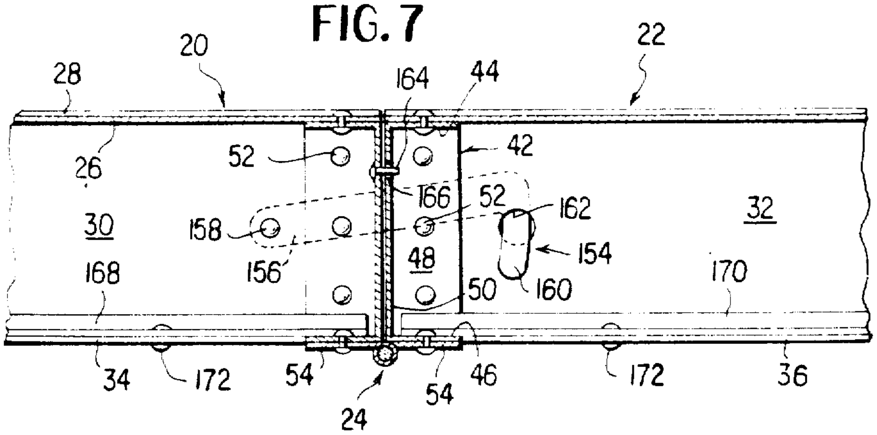
FIG. 7 is a vertical longitudinal cross-sectional view of the sawhorse of FIGS. 1 to 6, taken substantially along line 7—7 of FIG. 1 as viewed in the direction indicated by the arrows.

The beam 12 may conveniently be made of metal or plastic and is illustrated as of metal comprising first and second sections 20, 22 pivoted together by a piano hinge 24 as shown best in FIGS. 1, 2 and 7. The beam sections 20, 22 are substantially identical and each comprise an upper wall or surface 26 provided with beads or ribs 28 for strength, a pair of depending side walls 30, 32 and a pair of bottom flanges 34, 36. An end wall 38 and bottom flange 40 complete the unitary piece which comprises the bulk of each of the beam sections 20, 22.

As shown best in FIG. 7, the inner or pivoted ends of the beam sections 20, 22 include a rectangular insert 42 comprising a top wall 44, bottom wall 46, side walls 48 and end wall 50 snuggly received in the open end of the beam sections 20, 22. Suitable connecting means 52, such as rivets or the like, attach the inserts 42 securely to the beam sections 20, 22.

It will be seen that the inserts 42 provide the necessary support for the piano hinge 24. As is evident, the flanges 54 of the piano hinges 24 are secured to the bottom insert wall 46 and thereby mount the beam sections 20, 22 for pivotal movement about an axis 56 residing adjacent the plane defined by the bottom flanges 34, 36.

Inside the free or distal ends of the beam sections 20, 22 is another insert 58 (FIGS. 9 and 10) comprising a top wall 60, side walls 62, bottom flanges 64, end walls 66 and bottom end flanges 68. The inserts 58 are snuggly received in the outer end of the beam sections 20, 22 and are secured in place by the pivotal mounting means 18 as will be more fully explained hereinafter. One of the ends of the beam 12 may be configured with a recess 70 providing a hand grip for carrying the collapsible sawhorse 10.

Because of the depth of the side walls 30, 32, the provision of the bottom flanges 34, 36, the grooves or ribs 28 and the inserts 42, 58, the beam sections 20, 22 are of substantial strength even though they may be made of quite thin sheet material. In one prototype of this invention, made of aluminum sheet of 0.032" thickness, the sawhorse 10 weighs twelve pounds and can readily support a 250 pound individual with no perception by the individual that the device is rickety. In a static test, the prototype supported 365 pounds and did not fail.

The leg pairs 14, 16 are substantially identical comprising substantially identical legs 72, 74 interconnected by a collapsible brace 76. The legs 72, 74 each comprise an outer section 78 and a telescoping related inner section 80. The outer section 78 comprises an outwardly facing wall 82 providing an elongate outwardly extending convex rib 84 extending longitudinally along the length thereof. A pair of side walls 86, 88 merge with the outer wall 82 and have turned up ends 90, 92 forming a pair of spaced U-shaped channels for receiving the inner telescoping leg section 80.

The inner leg section 80 is sized to be received in the outer leg section 78 and comprises an outer wall 94 having an elongate outwardly concave rib 96 extending longitudinally along the length thereof in alignment with the rib 84 of the outer leg section 78. A pair of side walls 98, 100 merge with the outer wall 94 and have turned up ends 102, 104 received in the U-shaped channels provided by the outer leg section 78.

It will accordingly be seen that the leg sections 78, 80 are telescopingly related. In order to place the leg sections 78, 80 in load supporting relation, a stop 106 is provided. The stop 106 conveniently comprises a threaded fastener having a head 108 on one end thereof and a nut 110 on the other. The threaded fastener 106 is loosely received in an opening in the rib 84 and is capable of limited movement perpendicular to the outer wall 82. In order to allow telescoping movement of the inner and outer leg section 78, 80, the fastener 106 is moved toward the left in FIG. 5 so that the head 108 is disposed in the channel afforded by the ribs 84, 96. Such a condition is illustrated in the right portion of FIG. 4 where the inner leg section 80 is received on the interior of the outer leg section 78.

In order to place the leg sections 78, 80 in load supporting condition, a user may grasp the lower end of the leg section 80 through a slot 112 in the bottom of the upper leg section 78 and pull downwardly on the lower leg section 80. As shown best in FIGS. 4 and 6, the upper end of the inner leg section 80 provides a downwardly extending slot 114. After the leg 80 has been pulled downwardly so that the bolt head 108 clears the top of the lower leg section 80, the fastener 106 is pushed inwardly so that the shank of the bolt comes to reside in the slot 114.

The nested relationship of the legs 72, 74 is best illustrated in FIG. 9. Although the legs 72, 74 are preferably identical, for ease of manufacture, they may be nested merely by offsetting one leg relative to the other.

The collapsible brace 76 comprises first and second braces 116, 118 pivotally connected, at the outer ends thereof, to the outer leg sections 78 of the legs 72, 74. As shown best in FIG. 8, the brace 118 may be pinned directly to the side wall 88 while the brace 116 is necessarily pinned to a member 120 extending from the leg 72. The inner ends of the braces 116, 118 are pivotally connected to a link 122. It will accordingly be seen that the brace 76 is collapsible to a position no wider than the dimension of the nested legs 72, 74, as shown in FIG. 8.

Figures 4, 5, 6:
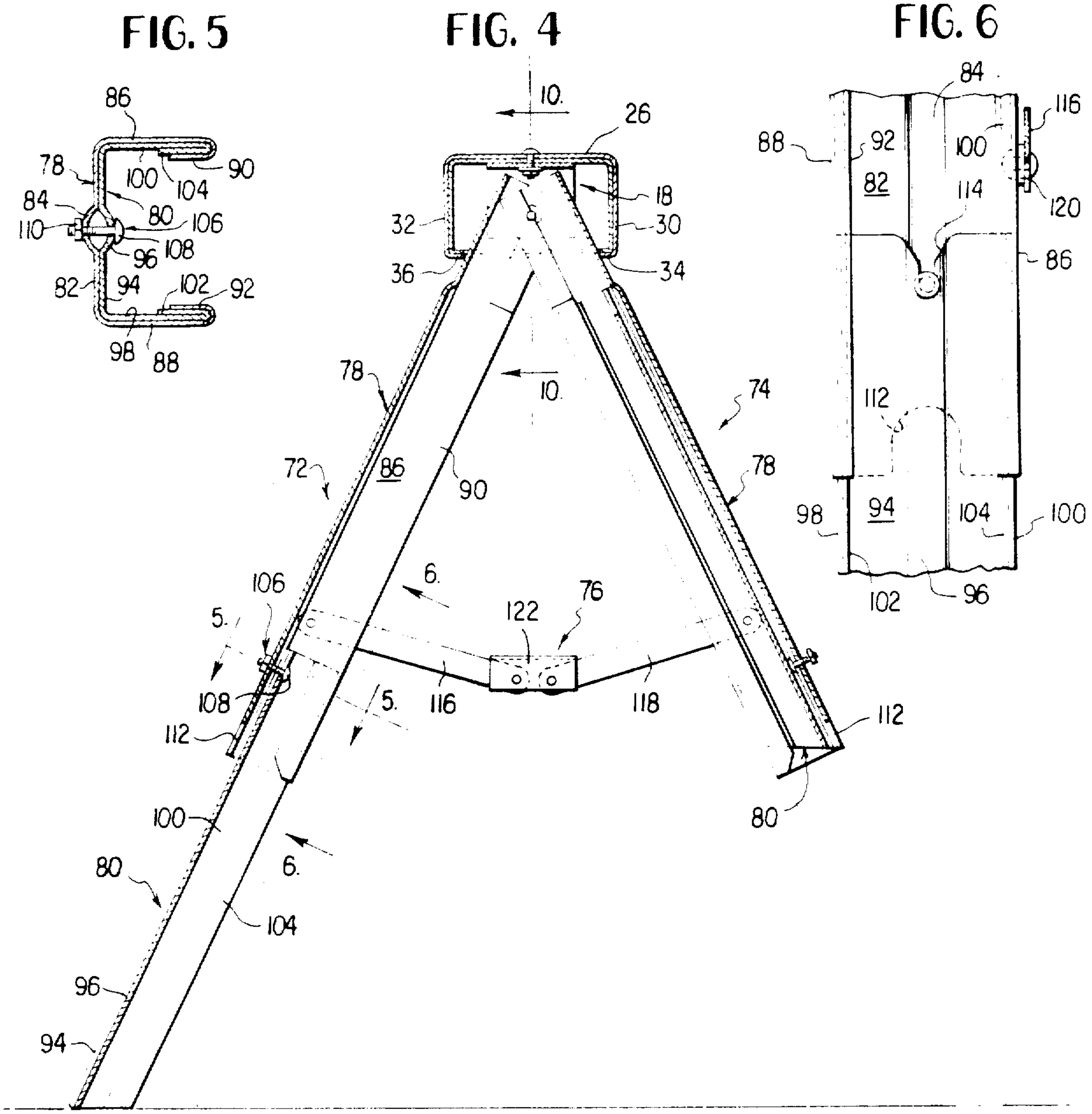
FIG. 4 is a vertical cross-sectional view of the sawhorse of FIGS. 1-3, taken substantially along line 4—4 of FIG. 1 as viewed in the direction indicated by the arrows.
FIG. 5 is a cross-sectional view of the sawhorse leg of FIG. 4, taken substantially along line 5—5 thereof as viewed in the direction indicated by the arrows.
FIG. 6 is a cross-sectional view of the sawhorse of FIG. 4, taken substantially along line 6—6 thereof as viewed in the direction indicated by the arrows.

The mounting means 18 is best illustrated in FIGS. 4, 9 and 10 and comprises means for pivotally mounting the legs 72, 74 for individual movement about a first axis 124 and mounting the leg pairs 14, 16 for movement about an axis 126 perpendicular to the axis 124. Movement of the legs 72, 74 about the axis 124 allows movement thereof between the nested position illustrated in phantom in the left of FIG. 2 and the spread configuration illustrated in the right of FIG. 2. During manipulation of the sawhorse 10 from the load supporting position of FIG. 1, the legs 72, 74 are conveniently first untelescoped as suggested by the arrow 128 in FIG. 2. The brace 76 is then collapsed by movement in the direction suggested by the arrow 130 so that the legs 72, 74 are rotated toward each other about the axis 124 as suggested by the arrows 132 until the legs 72, 74 are nested as shown in phantom on the left of FIG. 2. The nested legs 72, 74 are then rotated 90 degrees about the axis 126 as suggested by the arrow 134. This positions the axis 124 so the nested legs can be rotated 90 degrees as suggested by the arrow 136. This allows the legs to be received through the open bottom of the beam sections 20, 22. With both leg pairs 14, 16 disposed in the beam sections 20, 22, the beam halves are rotated as allowed by the piano hinge 24 into the configuration shown in FIG. 3.

To these ends, the mounting means 18 comprises a generally U-shaped bracket 140 having a generally planar base 142 and a pair of depending parallel legs 144 having an angled end 145 secured to the base 142 in any suitable manner, as by weldments or rivets (not shown). The fastener 146 connects the base 142 to the beam 20 and mounts the bracket 140 for rotation about the axis 126. A second threaded fastener 148 spands between the bracket legs 144 and passes through suitable apertures in the legs 72, 74 to mount the legs 72, 74 for rotation about the axis 128.

An important feature of the mounting means 18 is best shown in FIG. 9. Provided on the top wall 60 of the insert 58 is a rectangular array of dimples 150. The dimples 150 are positioned on the top wall 60 to engage the upturned corners 151 of the base 142 when the pivot axis 124 is parallel to the beam 20. The dimples 150 act to temporarily warp the corners 151 thereby rigidifying the base 142 when the legs 72, 74 are in their load supporting position. It will be seen, of course, that when the bracket 140 is rotated 90 degrees to nest the legs 72, 74, the dimples 150 pass out of engagement with the corners 151 and no longer provide a stiffening feature for the base 142.

The base 142 is generally planar with the center thereof snuggly captivated against the top wall 60 by the fastener 46. The base 142 and the ends 145 are connected at a point 152 so there is some bow in the base 142. The outer ends of the corners 151 are preferably substantially parallel to the wall 60 so that, when the corners 151 rotate into engagement with the dimples 150, there is an interference fit between the bracket 140 and the top wall 60 which substantially rigidifies the sawhorse 10 in its load supporting position.

If desired, a shim 153 may be provided to rigidify the legs 72, 74 on the shank of the fastener 148. The shims 153 are not visible in FIG. 9. Referring to FIGS. 1, 3 and 7, a latch 154 is provided to connect the beam sections 20, 22 in the load supporting positions of FIGS. 1 and 7 and for connecting the beam sections 20, 22 in the collapsed position of FIG. 3. To these ends, the latch 154 comprises a leg 156 pivotally connected to the beam section 20 by a rivet 158 or the like and having an ear 160 on the free end thereof which is mounted for movement into an opening 162 provided in the beam section 22. It will be evident that the latch 154 is capable of preventing inadvertent pivotal movement of the beam sections 20, 22 in the load supporting position, as when the sawhorse 10 is moved. It will likewise be evident that the latch 154 is capable of retaining the beam sections 20, 22 in the collapsed position when storage is desirable.

Referring to FIGS. 7, another feature of the invention is illustrated. In order to minimize racking of the beam sections 20, 22 relative to one another in the load supporting position, a plurality of projections 164 are affixed to the end walls 50 of the beam 20 and extend into a slightly elongated slot 166 provided in the end wall 50 of the beam section 22. The slots 166 are of a width substantially the same as the projection 164. Typically, the projections 164 are disposed in a plane parallel to the axis of the piano hinge 24. With the pins 164 engaged in the slots 166, it will be seen that relative twisting between the beam sections 20, 22 is significantly minimized.

Referring to FIGS. 7 and 10, another feature of the invention is illustrated. In order to prevent the inserts 42 from being pulled out of the end of the beam sections 20, 22, a pair of angles 168, 170 extend from the inserts 42 to the inserts 58 at the ends of the beam sections 20, 22. Suitable rivets 172, secure the angles 168, 170 to the bottom flanges 34, 36 and secure the angles 168, 170 to the inserts 42, 58.

Although the invention has been described in its preferred form with a certain degree of particularity, it is understood that the present disclosure of the preferred form is only by way of example and that numerous changes in the details of construction and combination and arrangement of parts may be resorted to without departing from the spirit and scope of the invention as hereinafter claimed.

I claim:

1. A collapsible sawhorse comprising a beam for supporting a load including first and second sections pivoted together for movement between a first position in which an upper surface of the sections are coplanar and a second position in which the upper sections are parallel;

two pairs of legs, at opposite ends of the beam, for supporting the beam in the first position thereof; and means pivotally connecting each pair of legs to the beam for movement between a first load supporting position and a second position parallel to the beam sections, including means mounting each leg for pivotal movement toward the other leg of its pair; and means mounting each pair of legs for pivotal movement about an axis perpendicular to the upper section surface.

2. The collapsible sawhorse of claim 1 wherein the second mentioned mounting means comprises a bracket and means mounting the bracket for pivotal movement about the axis.

3. The collapsible sawhorse of claim 2 wherein the first mentioned mounting means includes means mounting the legs to the bracket for pivotal movement about an axis perpendicular to the axis which is perpendicular to the upper section surface.

4. The collapsible sawhorse of claim 3 wherein the legs of each pair are nestable and further include a collapsible brace interconnecting the legs of each pair.

5. The collapsible sawhorse of claim 4 wherein the legs of each pair include first and second telescoping sections and means for retaining the leg sections in an extended position.

6. The collapsible sawhorse of claim 5 wherein the beam sections include side walls transverse to the upper surfaces, the legs residing within the confines of the side walls in the second position thereof.

7. The collapsible sawhorse of claim 6 further comprising a latch for securing the beam sections in the first position and in the second position.

8. The collapsible sawhorse of claim 7 wherein the latch comprises a lever pivoted to one of the beam sections, the other beam section forming a receiver for the latch in the latched position, the same lever and receiver being effective to latch the beam sections in both the first and second positions thereof.

9. The collapsible sawhorse of claim 1 wherein the last mentioned mounting means includes means providing a tight interference fit in the first position of the leg pairs and a loose fit, allowing substantially more play in the mounting means, in the second position of the leg pairs.

* * * * *